May 22, 1945.   F. R. RUTHER   2,376,507
SPLINT SUPPORT
Filed Dec. 2, 1942   3 Sheets-Sheet 1
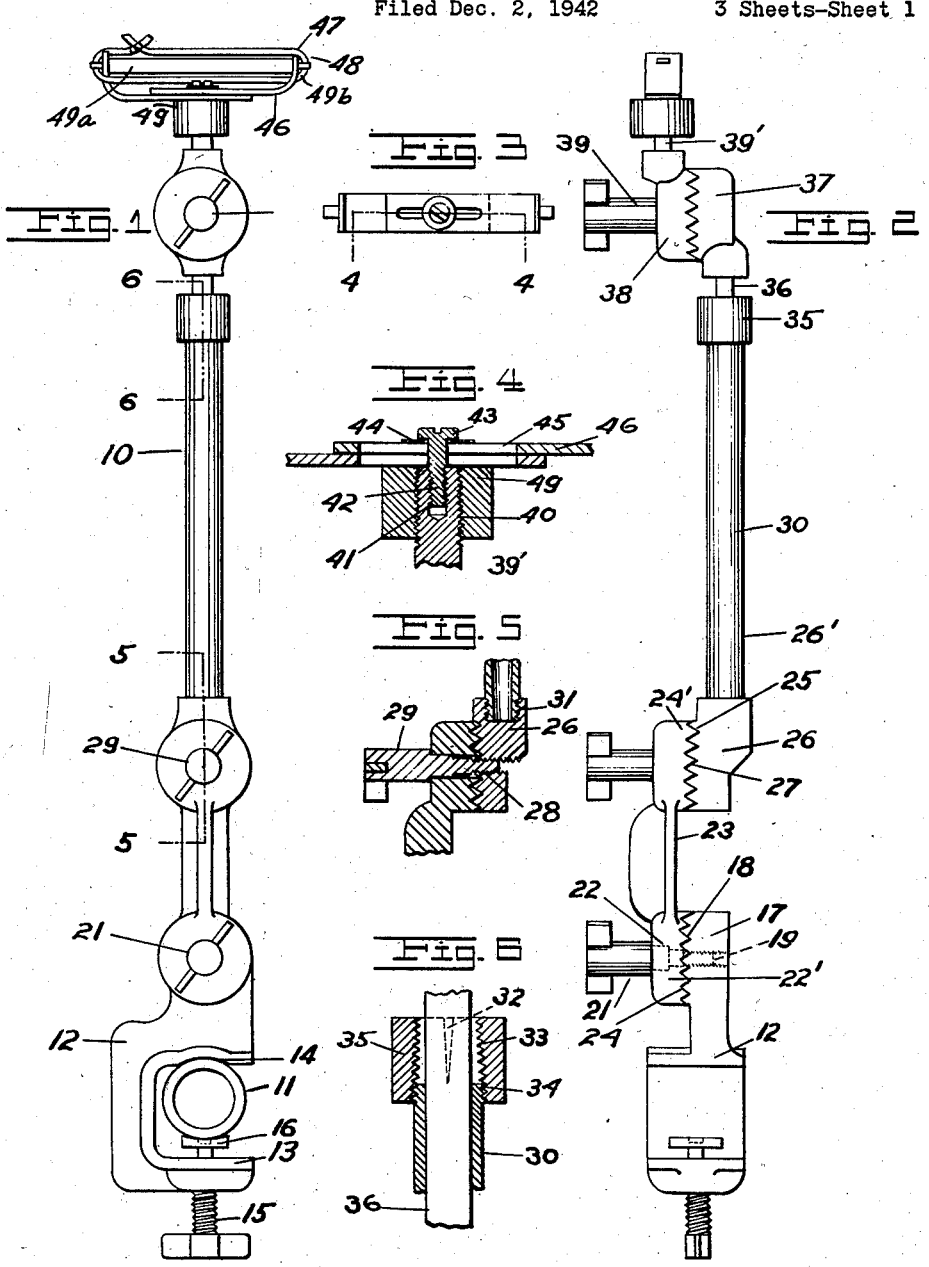
INVENTOR.
Frank R. Ruther
BY May 22, 1945.  F. R. RUTHER  2,376,507
SPLINT SUPPORT
Filed Dec. 2, 1942  3 Sheets-Sheet 2
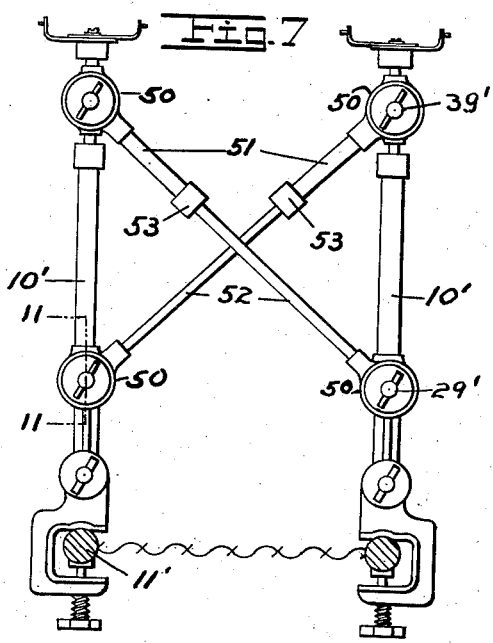
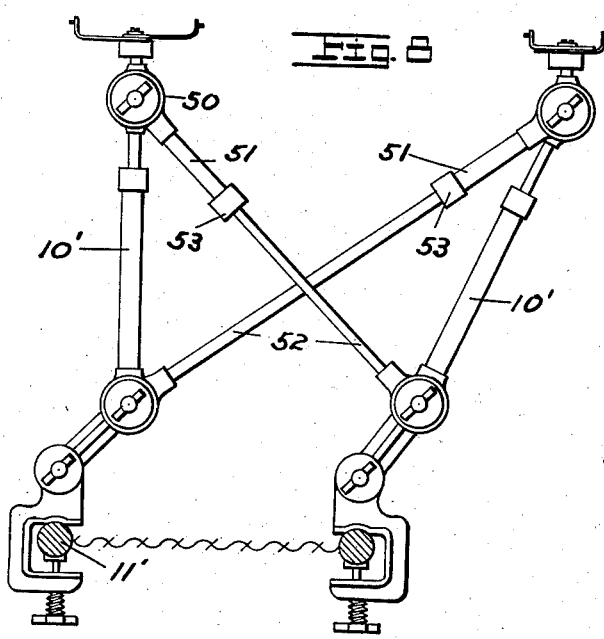
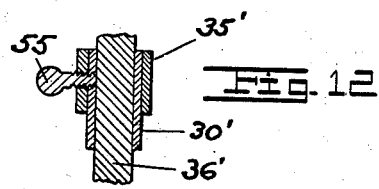
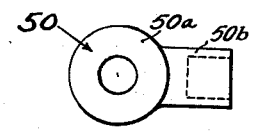
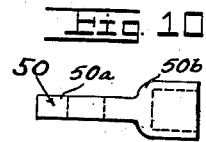
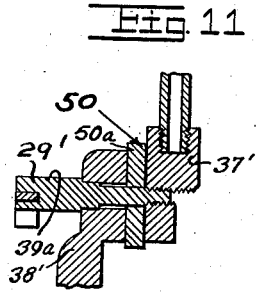
INVENTOR.
Frank R. Ruther
BY
R. J. Craig May 22, 1945.  F. R. RUTHER  2,376,507
SPLINT SUPPORT
Filed Dec. 2, 1942  3 Sheets-Sheet 3
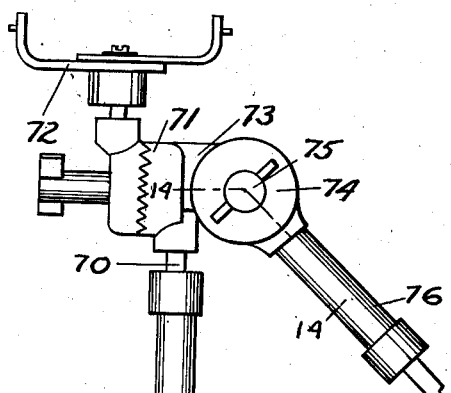
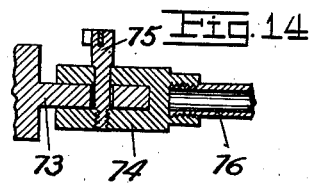
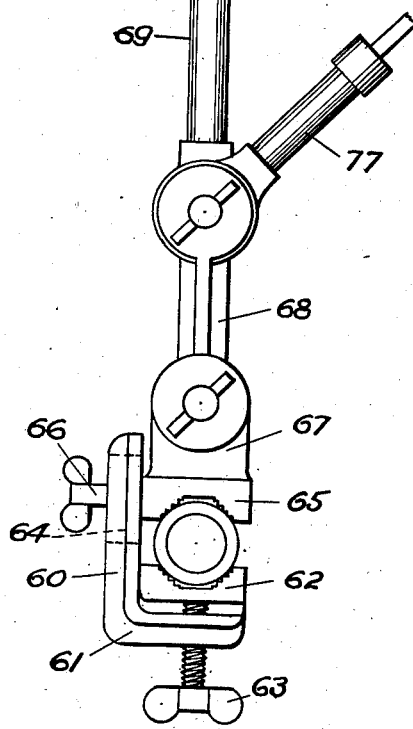
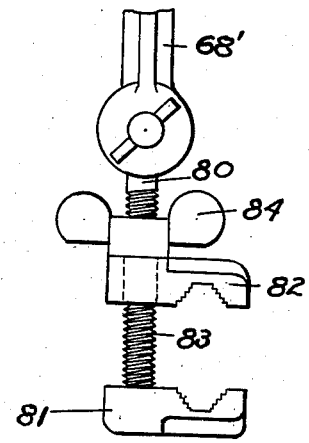
INVENTOR.
Frank R. Ruther
BY
ATTORNEY Patented May 22, 1945

2,376,507

UNITED STATES PATENT OFFICE 2,376,507

SPLINT SUPPORT

Frank R. Ruther, Whittier, Calif.

Application December 2, 1942, Serial No. 467,583

6 Claims. (Cl. 5—92)

This invention relates to splint supports.

The general object of the invention is to provide a novel adjustable support for holding a splint which has been placed on a fractured limb in a desired position.

A more specific object of the invention is to provide a splint support provided with a novel means permitting a splint to be held in a desired position.

An additional object of the invention is to provide a splint support which is particularly adapted for mounting on the handles of a stretcher.

A further object of the invention is to provide an improved articulated and extensible duplex support for a splint.

An additional object of my invention is to provide a splint support which may be used with patients of any size.

A further object of my invention is to provide a splint support which will permit the transport of casualties from the field of accident to a receiving station or hospital in complete comfort.

Other objects and advantages of my invention will be apparent from the following description taken in connection with the accompanying drawings wherein:

Fig. 1 is a front view of a splint support embodying the features of my invention;

Fig. 2 is a side elevation showing the support;

Fig. 3 is a top plan view of the splint receiving arms;

Fig. 4 is an enlarged section taken on line 4—4, Fig. 3;

Fig. 5 is a section taken on line 5—5, Fig. 1;

Fig. 6 is an enlarged section taken on line 6—6, Fig. 1;

Fig. 7 is a front view showing my duplex splint support construction;

Fig. 8 is a view similar to Fig. 7 showing the duplex construction in adjusted position;

Fig. 9 is a side elevation showing one of the coupling members;

Fig. 10 is a top plan view of the coupling member;

Fig. 11 is a section taken on line 11—11, Fig. 7;

Fig. 12 is a sectional detail of a modified clamp;

Fig. 13 is a front view with parts broken away showing another preferred type of splint support;

Fig. 14 is a section taken on line 14—14, Fig. 13, and

Fig. 15 is a fragmentary side elevation showing a modified clamp.

Referring to the drawings by reference characters I have shown my invention as embodied in a splint support which is indicated generally at 10. As shown the support is adapted to be mounted upon the handle 11 of a stretcher.

The splint support includes a bracket 12, having a jaw 13 with a recessed portion 14 shown at the top of the jaw. The bracket includes a thumb screw 15 which has a head 16 rotatable thereon and the construction is such that when the thumb screw 15 is rotated the head 16 will engage the stretcher handle 11 to hold the splint support in place.

The bracket 12 at its upper extremity is provided with a rounded boss 17 which has a serrated face 18 thereon. The boss 17 is provided with a threaded aperture 19 which receives a threaded securing member 21. The securing member has a shank 22 which includes a cylindrical portion which rotatably supports a boss 22' on a link 23. The boss 22' has serrations 24 which match the serrations 18 on the boss 17 and the construction is such that when the threaded member 21 is tightened the link 23 will be held on the bracket 12 in the desired adjusted position.

The link 23 on the end remote from the boss 22' includes a second boss 24' which is similar to the boss 22' and is provided with serrations 25. The boss 24' engages a companion boss 26 of a column member 26'. The boss 26 is serrated as at 27 and is provided with a threaded aperture 28 which receives a second securing member 29 similar to the member 21 previously described. The column member 26' includes a tubular member 30 which is threaded at its lower end and engages threads 31 on the boss 26. The upper end of the tube is slitted as at 32 and provided with tapered threads 33 which are engaged by similar threads 34 on a collar 35. A rod 36 telescopes in the tubular member 30 and when the collar 35 is tightened the rod 36 is held in adjusted position. The rod 36 is provided with a boss 37 which is held on a companion boss 38 by securing member 39 similar to the parts previously described.

The boss 38 has a splint support member or rod 39' extending upwardly therefrom. This rod is externally threaded as at 40 and is counter-bored and internally threaded as at 41. A threaded pin 42 is mounted in the threaded bore 41 and has a head 43 which engages a washer 44. The pin 42 is arranged in slots 45 in superimposed splint receiving arms 46. These arms have upward extending end portions 47 and have attaching ears 48 which may be welded thereon. A lock nut 49 engages the threads 40. When this lock nut is tightened it engages the lowermost of the arms 46 and holds these arms in adjusted position by clamping the uppermost arm against the head 43 of the pin 42.

My splint support is primarily intended for use with emergency splints such as are applied to stretcher cases. Emergency splints have an end portion which in the case of a leg splint projects beyond the foot of the patient. This projecting portion is grasped by the attendant in handling a patient.

In the use of my device the bracket 12 is mounted on a suitable support as, for instance, the handle of a stretcher. By manipulating the securing members 21, 29 and 39 the column 26' is arranged in the proper position and the collar 35 is released and the rod 36 moved so that it is the correct length. This adjustment is made by the attendant after he has seen the patient and noted the patient's size, etc. The lock nut 49 is then released and the splint receiving arms 46 are adjusted so that the projecting end of the splint may be best supported upon the splint receiving arms. The lock nut is then secured.

After the arms 46 have been arranged in proper position to receive the end of the splint the latter, designated 49a in Fig. 1, is arranged upon one of the arms 46 and is secured in place by a suitable fastening means such as a strap 49b. The strap is arranged to pass upon both sides of the adjacent ear 48 so that shifting of both the strap and splint is avoided.

The construction of the bracket, link, column member, etc., allows practically universal adjustment of the splint receiving arms so that the splint can be adjusted to the most advantageous position.

In Figs. 7 to 11 I show my duplex support wherein a pair of members 10' are employed upon the handles 11' of a stretcher. In using my duplex support the projecting end of one splint is supported by one of the members 10' and the projecting end of the other splint is supported by the other member 10'. The members 10' are similar in all respects to the members 10 previously described except that the serrations 18, 24, etc., are preferably omitted and coupling members 50 are arranged between the bosses 37' and 38' (see Fig. 11). Each coupling member 50 includes an eye portion 50a and an integral socket portion 50b. The eye portions 50a are arranged between the bosses 37' and 38', as shown in Fig. 11 and are held in place by the securing members 39a. The upper socket members 50b receive tubular members 51 while the lower socket members receive rods 52 which move in the tubular members 51. The free ends of the tubes 51 are split after the manner shown in Fig. 6 and are tapered and receive threaded collars 53, similar to the collars 35 previously described, and the construction is such that by releasing the collars 53 the rods 52 may be adjusted to various positions after which the collars 53 may be tightened.

The duplex construction provides a very rigid, easily adjusted, splint support which permits splints to be securely held in many positions; one of these positions, by way of example, is shown in Fig. 8 but this is merely typical of the many positions the splint support may assume.

In Fig. 12 I show a modification of the clamping means which may be used in place of the clamping collar 35. In the modification the rod 36' moves in a tubular member 30', the latter having a collar 35' fixed thereon. A threaded aperture extends through the tube 30' and collar 35' and receives a set screw 55, the inner end of which engages the rod 36' to hold the latter in adjusted position.

Fig. 13 and Fig. 14 disclose a preferred modification of my invention wherein the clamping member includes a bracket 60 having a fixed end 61 thereon and having a slidable jaw 62 movable from and towards the end 61 by means of a thumb screw 63. The jaw 62 has an end which moves in a slot 64 in the bracket 60. Opposite the jaw 62 I arrange a second jaw 65 which has an end slidable in the slot 64. The jaw 65 is held in position by a thumb screw 66 which passes through the slot 64.

The jaw 65 supports a bracket 67 which in turn supports a link 68 and column member 69. The column member supports a rod 70 having a boss 71 thereon. The boss 71 supports a splint support arm 72. The construction of the link 68, column 69, etc., is similar to that previously described in connection with Figs. 7 to 11, inclusive. The boss 71, however, is turned at right angles to the boss on the link 68 and in addition the boss 71 carries an integral ear 73 which rotatably supports a fitting 74. This fitting 74 is held in adjusted position by a securing member 75 similar to the securing member 21 and the fitting 74 supports a tubular member 76 similar to the tubular member 51 previously described. Also the link 68 supports a similar tubular member 77. The members 76 and 77 when employed are used in connecting a pair of the splint support members as described in connection with Figs. 7 to 11 above.

In Fig. 15 I show a modified clamping member wherein the link 68' supports a rod 80 which has a jaw 81 on the lower end thereof. This jaw cooperates with a jaw 82 which slides over threads 83 on the rod 80 and is held in adjusted position by a thumb nut 84 which threadedly engages the threads 83. In the different forms of applicant's invention the brackets 12 are mounted upon the handle portion of the stretcher for leg fracture cases. For an arm fracture case the bracket 12 may be secured to the stretcher rail alongside the body supporting portion of the stretcher.

From the foregoing description it will be apparent that I have invented a novel splint support which can be economically manufactured and which is highly efficient for its intended purpose.

Having thus described my invention, I claim:

1. In a splint support, a bracket having a recess adapted to receive the handle of a stretcher, adjustable clamping means on the bracket for engaging a handle, said bracket having a boss thereon, said boss having a threaded aperture, a threaded member fitted in said aperture, a link having an apertured boss at each end, one of said link bosses being fitted on said threaded member, said threaded member having shoulder engaging said one link boss, a tubular column member having a fitting at one end thereof, said fitting having a threaded aperture therein, a second threaded member in said fitting aperture, the other link boss being fitted on said second threaded member, said second threaded member having a shoulder engaging the other of said link bosses, a rod slidable in said tubular column, said tubular column having a slit, tapered, threaded end with a threaded collar thereon, said collar being adapted to releasably clamp said rod in said tubular column, an apertured boss on said rod, a splint support member rotatably mounted on said rod boss, a threaded rod on said splint support member and having its end externally and internally threaded, a reduced headed pin on the internal threads of said splint support member rod, a pair of superimposed splint receiving arms having slots therein mounted on said pin and a lock nut on the external threads of said splint support member rod and engaging the lower of said splint receiving arms.

2. In a splint support a bracket, adjustable clamping means on the bracket adapted to engage a handle on a stretcher, said bracket having a boss thereon, said boss having a threaded aperture, a threaded member fitted in said aperture, a link having an apertured boss at each end, one of said link boss apertures receiving said threaded member, a tubular column member having a fitting at one end thereof, said fitting having a threaded aperture therein, a second threaded member in said fitting aperture, the other link boss aperture receiving said second threaded member, a rod slidable in said tubular column, means to releasably clamp said rod in said tubular column, an apertured boss on said rod, a splint support member rotatably mounted on said rod boss, a rod on said splint support member, a pair of superimposed splint receiving arms mounted on said splint support member rod and means to hold said arms in place.

3. In a splint support a bracket, adjustable clamping means on the bracket adapted to engage a handle on a stretcher, said bracket having a boss thereon, said boss having a threaded aperture, a threaded member fitted in said aperture, a link having an apertured boss at each end, one of said link boss apertures receiving said threaded member, a tubular column member having a fitting at one end thereof, said fitting having a threaded aperture therein, a second threaded member in said fitting aperture, the other link boss aperture receiving said second threaded member, a rod slidable in said tubular column, means to releasably clamp said rod in said tubular column, an apertured boss on said rod, a splint support member rotatably mounted on said rod boss, a threaded rod on said splint support member and having its end externally and internally threaded, a reduced headed pin on the internal threads of said splint support member rod, a pair of superimposed splint receiving arms having slots therein mounted on said pin and a nut on the external threads of said splint support member rod and engaging the lower of said splint receiving arms.

4. A splint support comprising a pair of laterally spaced opposed brackets, clamping means on each bracket adapted to engage a handle on a stretcher, a pair of links, means respectively supporting one end of each link on one of the brackets, a pair of tubular column members, means respectively supporting the column members on the other ends of the links, a rod slidable in each tubular column, means to releasably clamp each rod in its tubular column member, a splint support member rotatably mounted on each rod, a splint receiving arm mounted on each splint support member, means to hold each splint receiving arm in place, an extensible link connecting one of said rods and the opposed supporting link and a second extensible link connecting the other rod and the other supporting link.

5. A splint support comprising a pair of laterally spaced opposed brackets, clamping means on each bracket adapted to engage a handle on a stretcher, each bracket having a boss thereon, each boss having an aperture, a pair of links, releasable means in each of said apertures respectively supporting one end of the respective links, a pair of tubular column members, means to support the column members on the other ends of the links, a rod slidable in each tubular column member, means to releasably clamp each rod in its tubular column member, a splint support member rotatably mounted on each rod, a pair of superimposed splint receiving arms mounted on each splint support member, means to hold each pair of splint receiving arms in place, an extensible link connecting the upper end of one of said rods and the lower end of the opposed supporting link and a second extensible link connecting the upper end of the other rod and the lower end of the other supporting link, said extensible links being spaced from said splint receiving arms.

6. A splint support comprising a pair of laterally spaced opposed brackets, clamping means on each bracket adapted to engage a handle on a stretcher, each bracket having a boss thereon, each boss having an aperture, a pair of links, means in each of said apertures respectively supporting one end of the respective links, a pair of tubular column members, means to support the column members on the other ends of the links, a rod slidable in each tubular column member, means to releasably clamp each rod in its tubular column member, a splint support member rotatably mounted on each rod, a pair of superimposed splint receiving arms mounted on each splint support member, means to hold each pair of splint receiving arms in place, an extensible link connecting one of said rods and the opposed supporting link and a second extensible link connecting the other rod and the other supporting link.

FRANK R. RUTHER.